United States Patent
Liu et al.

(10) Patent No.: US 11,704,105 B2
(45) Date of Patent: Jul. 18, 2023

(54) METHOD, DEVICE, AND COMPUTER PROGRAM PRODUCT FOR MANAGING VIRTUAL MACHINE UPGRADE

(71) Applicant: EMC IP Holding Company LLC, Hopkinton, MA (US)

(72) Inventors: Qin Liu, Chengdu (CN); Jie Liu, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 320 days.

(21) Appl. No.: 16/871,506

(22) Filed: May 11, 2020

(65) Prior Publication Data
US 2021/0263721 A1 Aug. 26, 2021

(30) Foreign Application Priority Data
Feb. 25, 2020 (CN) .......................... 202010117254.7

(51) Int. Cl.
*G06F 8/65* (2018.01)
*G06F 9/4401* (2018.01)
*G06F 9/50* (2006.01)

(52) U.S. Cl.
CPC .............. *G06F 8/65* (2013.01); *G06F 9/4401* (2013.01); *G06F 9/5077* (2013.01)

(58) Field of Classification Search
CPC ........ G06F 8/65; G06F 9/4401; G06F 9/5077; G06F 2009/45595
See application file for complete search history.

(56) References Cited

U.S. PATENT DOCUMENTS

| | | | | |
|---|---|---|---|---|
| 2010/0042988 A1* | 2/2010 | Lundin | ............... | G06F 9/44505 717/176 |
| 2011/0138383 A1* | 6/2011 | Le | ........................ | G06F 9/5077 718/1 |
| 2011/0214018 A1* | 9/2011 | Vidal | ................... | G06F 11/0715 714/48 |
| 2012/0144391 A1* | 6/2012 | Ueda | .................... | G06F 9/45558 718/1 |
| 2013/0046740 A1* | 2/2013 | Li | ........................ | G06F 16/176 707/803 |
| 2015/0220324 A1* | 8/2015 | Arcese | ..................... | G06F 8/63 717/170 |
| 2017/0235563 A1* | 8/2017 | Bafna | ................. | G06F 16/1774 718/1 |

* cited by examiner

*Primary Examiner* — Hanh Thi-Minh Bui
(74) *Attorney, Agent, or Firm* — Womble Bond Dickinson (US) LLP

(57) ABSTRACT

Embodiments of the present disclosure relate to a method, a device, and a computer program product for managing virtual machine upgrade. Provided is a method for managing virtual machine upgrade, including: determining, based on a received upgrade file for a virtual machine, a state of the virtual machine; and controlling, based on determining that the state indicates the virtual machine not being accessible via a network, installation of the upgrade file on the virtual machine via a virtual machine agent or a virtual machine manager, the virtual machine agent being capable of modifying a virtual disk of the virtual machine. Through the embodiments of the present disclosure, the installation of the upgrade file on the virtual machine can be realized when the virtual machine is not accessible via the network, whilst simplifying the virtual machine configuration and reducing the network bandwidth occupancy.

12 Claims, 6 Drawing Sheets

METHOD, DEVICE, AND COMPUTER PROGRAM PRODUCT FOR MANAGING VIRTUAL MACHINE UPGRADE

CROSS-REFERENCE TO RELATED APPLICATION

This patent application claims priority, under 35 U.S.C. § 119, of Chinese Patent Application No. 202010117254.7, filed Feb. 25, 2020, which is incorporated by reference in its entirety.

TECHNICAL FIELD

Embodiments of the present disclosure generally relate to the field of information processing, and specifically to a method, a device, and a computer program product for managing virtual machine upgrade.

BACKGROUND

At present, for upgrade of a virtual machine, generally an upgrade management device sends an upgrade file directly to the virtual machine via a network. For example, in a data backup scenario, in order to avoid data loss, a customer usually saves data of a virtual machine functioning as a backup client terminal in an upgrade management device functioning as a backup server. For the purpose of improving the security, improving the operating performance, or the like, the virtual machine needs to be upgraded frequently.

However, such a manner is only applicable to a virtual machine that can be accessed via the network, such as a virtual machine that is in a state of being powered on and having a network connection. When the virtual machine is in a power-off state or a state of having no network connection, the server fails to successfully send the upgrade file to the virtual machine, and can resend the upgrade file to the virtual machine only after the virtual machine recovers to the state of being powered on and having the network connection, thereby increasing the communication costs between the server administrator and the virtual machine administrator. In addition, the server needs to establish a connection for each virtual machine, which will occupy a lot of network bandwidth.

SUMMARY OF THE INVENTION

Embodiments of the present disclosure provide a method, a device, and a computer program product for managing virtual machine upgrade.

In a first aspect of the present disclosure, a method for managing virtual machine upgrade is provided. The method includes: determining, based on a received upgrade file for a virtual machine, a state of the virtual machine; and controlling, based on determining that the state indicates the virtual machine not being accessible via a network, installation of the upgrade file on the virtual machine via a virtual machine agent or a virtual machine manager, the virtual machine agent being capable of modifying a virtual disk of the virtual machine.

In a second aspect of the present disclosure, an electronic device is provided. The electronic device includes: at least one processing unit; and at least one memory, the at least one memory being coupled to the at least one processing unit and storing instructions to be executed by the at least one processing unit, the instructions, when executed by the at least one processing unit, causing the electronic device to execute an action, the action including: determining, based on a received upgrade file for a virtual machine, a state of the virtual machine; and controlling, based on determining that the state indicates the virtual machine not being accessible via a network, installation of the upgrade file on the virtual machine via a virtual machine agent or a virtual machine manager, the virtual machine agent being capable of modifying a virtual disk of the virtual machine.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method according to the first aspect of the present disclosure.

The Summary of the Invention is provided to introduce a selection of concepts in a simplified form, which will be further described in the Detailed Description below. The Summary of the Invention is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

The same or corresponding reference numerals in the accompanying drawings represent the same or corresponding components.

DETAILED DESCRIPTION

Embodiments of the present disclosure will be described below in more detail with reference to the accompanying drawings. While the embodiments of the present disclosure are shown in the accompanying drawings, it should be understood that the present disclosure can be implemented in various forms and should not be limited to the embodiments set forth herein. In contrast, these embodiments are provided to make the present disclosure more thorough and complete, and to fully convey the scope of the present disclosure to those skilled in the art.

The term "including" and variants thereof used herein indicate open-ended inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may be further included below.

Figure 1:
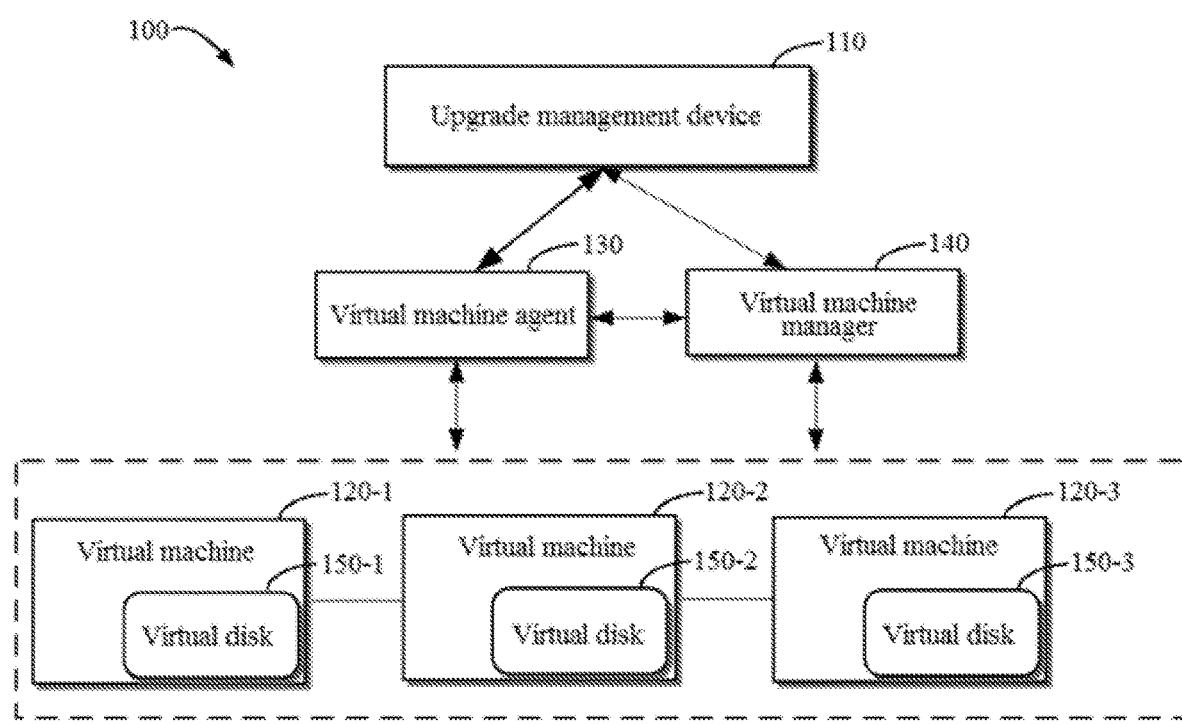
FIG. 1 shows a block diagram of an example virtual machine upgrade management system in which embodiments of the present disclosure can be implemented.

FIG. 1 shows a block diagram of example virtual machine upgrade management system 100 in which embodiments of the present disclosure can be implemented. As shown in FIG. 1, virtual machine upgrade management system 100 includes upgrade management device 110, virtual machines 120-1 to 120-3 (collectively referred to as virtual machines 120), virtual machine agent 130, and virtual machine manager 140. Various methods according to the embodiments of the present disclosure may be implemented at upgrade management device 110.

In order to better understand the motivation of the present invention, a virtual machine upgrade management system in a conventional solution is first described with reference to FIG. 2.

Figure 2:
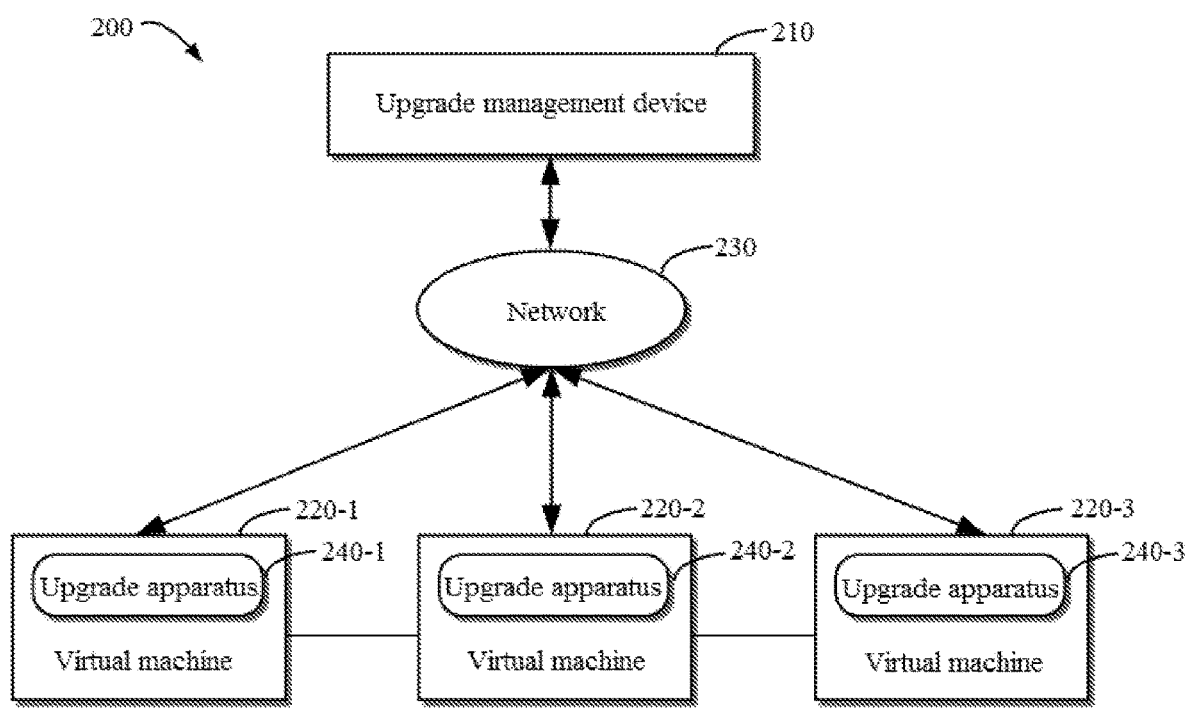
FIG. 2 shows a block diagram of a virtual machine upgrade management system in a conventional solution.

FIG. 2 shows a block diagram of virtual machine upgrade management system 200 in a conventional solution. As shown in FIG. 2, virtual machine upgrade management system 200 includes upgrade management device 210 and virtual machines 220-1 to 220-3 (collectively referred to as virtual machines 220). When an upgrade file is released by an upgrade file provider (not shown) to network 230, upgrade management device 210 downloads the upgrade file from network 230, and then sends, via network 230, the upgrade file to upgrade apparatuses 240-1 to 240-3 (collectively referred to as upgrade apparatuses 240) installed in virtual machines 220. Upgrade apparatuses 240 are responsible for installing the upgrade file in virtual machines 220.

The number of virtual machines is often much larger than the number of physical machines. With such a method, customers can install the upgrade file on a large number of virtual machines without having to log in to each virtual machine. However, such a method has some problems.

First of all, such a method is only applicable to a virtual machine that can be accessed via a network, such as a virtual machine that is in a power-on state and has an external network connection.

In some scenarios, if virtual machine 220 is in a power-off state for maintenance, then the virtual machine will miss installation of the upgrade file. In this case, an administrator of virtual machine 220 needs to notify an administrator of upgrade management device 210 when virtual machine 220 is powered on, so that the administrator of upgrade management device 210 reattempts to install the upgrade file. However, the administrator of upgrade management device 210 and the administrator of virtual machine 220 are often different people, thus increasing the communication costs.

In some other scenarios, if virtual machine 220 is in a power-on state, but has a network connection problem or the network is not ready yet, then upgrade management device 210 fails to successfully send the upgrade file to virtual machine 220. In this case, the administrator of upgrade management device 210 needs to monitor network connectivity of virtual machine 220, in order to reattempt to install the upgrade file when virtual machine 220 has a network connection. Similarly, the administrator of upgrade management device 210 and the administrator of virtual machine 220 are often different people, thus increasing the communication costs.

Second, to perform an upgrade with such a method, upgrade apparatus 240 needs to be installed in each virtual machine 220. For virtual machine 220, said upgrade apparatus 240 is an additional device, and is not used for other functions such as backup or recovery. In addition, a state of upgrade apparatus 240 will affect sending and installation results of the upgrade file.

Furthermore, to perform an upgrade with such a method, upgrade management device 210 needs to establish a network connection for each virtual machine 220, which will occupy a lot of ESXI external network bandwidth.

Embodiments of the present disclosure present a solution for managing virtual machine upgrade to solve the above problems and one or more of other potential problems. This solution controls the installation of the upgrade file on the virtual machine via the virtual machine agent or the virtual machine manager based on the state of the virtual machine, thus achieving successfully installing the upgrade file on the virtual machine when the virtual machine is not accessible via a network.

Embodiments of the present disclosure will now be further described in conjunction with FIG. 1. In example virtual machine upgrade management system 100 in which embodiments of the present disclosure can be implemented, upgrade management device 110 is a device capable of receiving the upgrade file and managing upgrade of virtual machines 120. Upgrade management device 110 may be, for example, a computer, a virtual machine, a server, or the like. The present disclosure is not limited in this regard. Virtual machine manager 140 is a device capable of centralizedly managing a virtual machine cluster, such as a vCenter server. Virtual machines 120-1 to 120-3 may be deployed on an ESXI server (not shown) and managed by virtual machine manager 140. Virtual machine agent 130 is a device capable of being connected to virtual machine manager 140 to read and modify virtual disks 150-1 to 150-3 (collectively referred to as virtual disks 150) of virtual machines 120. Upgrade management device 110, virtual machine agent 130, and virtual machine manager 140 may communicate with each other via a network. The network may be, for example, the Internet, an intranet, or the like.

It should be understood that a structure of virtual machine upgrade management system 100 is described for exemplary purposes only, and does not imply any limitation to the scope of the present disclosure. For example, the embodiments of the present disclosure may also be applied to a system different from virtual machine upgrade management system 100. It should be understood that a specific number of above devices is given for illustrative purposes only, and does not imply any limitation to the scope of the disclosure. For example, the embodiments of the present disclosure may also be applied to more or fewer virtual machines.

Figure 3:
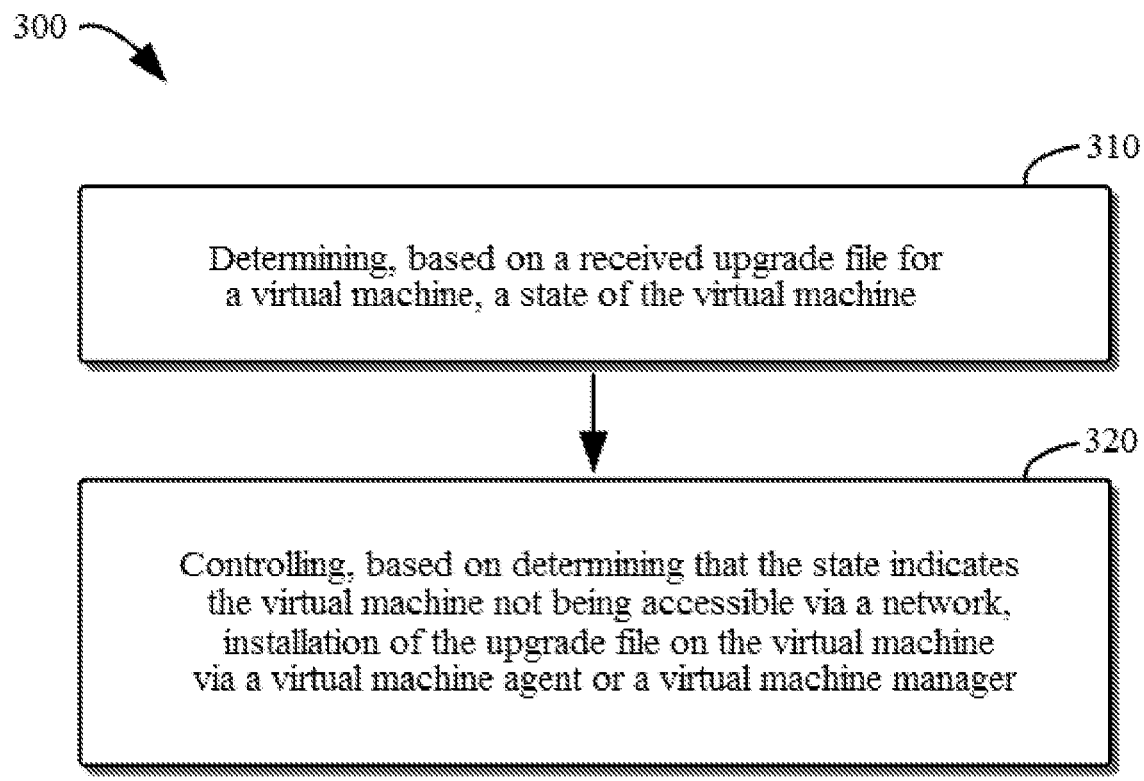
FIG. 3 shows a flowchart of an example method for managing virtual machine upgrade according to an embodiment of the present disclosure.

FIG. 3 shows a flowchart of example method 300 for managing virtual machine upgrade according to an embodiment of the present disclosure. For example, method 300 may be executed by upgrade management device 110 as shown in FIG. 1. It should be understood that method 300 may also be executed by other devices. The scope of the present disclosure is not limited in this regard. It should also be understood that method 300 may further include additional actions that are not shown and/or may omit actions that are shown. The scope of the present disclosure is not limited in this regard.

In 310, upgrade management device 110 determines, based on a received upgrade file for virtual machine 120, a state of virtual machine 120.

In some embodiments, upgrade management device 110 may receive a notification, when an upgrade file provider releases the upgrade file on a network, to receive the upgrade file. Alternatively or additionally, upgrade management device 110 may regularly detect whether an upgrade file for virtual machine 120 exists.

Additionally, in some embodiments, the upgrade file may be, e.g., a patch file, a general utility tool, and an application for the virtual machine, such as an OS security patch file for security purposes, an SQL plug-in for SQL server backup, and a download/file copy tool for file-level recovery.

After receiving the upgrade file for virtual machine 120, upgrade management device 110 determines the state of virtual machine 120 based on a state indicator received from virtual machine manager 140.

In some embodiments, virtual machine 120 may notify virtual machine manager 140 of its own state regularly, and virtual machine manager 140 generates a corresponding state indicator. Then, upgrade management device 110 may request the state indicator of virtual machine 120 from virtual machine manager 140, and determine the state of virtual machine 120 based on the received state indicator. Additionally, in some other embodiments, virtual machine 120 may notify virtual machine manager 140 to modify the state indicator when its own state changes. Additionally, in still other embodiments, virtual machine manager 140 may regularly send the state indicator of virtual machine 120 to upgrade management device 110.

In 320, upgrade management device 110 controls, based on determining that the state indicates virtual machine 120 not being accessible via a network, installation of the upgrade file on the virtual machine 120 via virtual machine agent 130 or virtual machine manager 140, said virtual machine agent 130 being capable of modifying virtual disk 150 of virtual machine 120.

For example, in some embodiments, if upgrade management device 110 determines, based on the state, that virtual machine 120 is not running and thus is not accessible via the network, for example, virtual machine 120 is in a power-off state, then upgrade management device 110 controls the installation of the upgrade file on virtual machine 120 via virtual machine agent 130. In a conventional virtual machine management system, a virtual machine agent is configured to directly back up a virtual disk of a virtual machine, and is not involved in installation of an upgrade file. Since the virtual machine agent can also modify the virtual disk of the virtual machine, the embodiment of the present disclosure may use the virtual machine agent for the installation of the upgrade file. How to install the upgrade file on the virtual machine via the virtual machine agent will be described in detail with reference to FIG. 4 below.

Additionally, in some other embodiments, if upgrade management device 110 determines, based on the state, that virtual machine 120 is running, but is not accessible via the network, for example, the virtual machine is in a power-on state, but has a network connection problem or the network is not ready, then upgrade management device 110 controls the installation of the upgrade file on virtual machine 120 via virtual machine manager 140. For example, upgrade management device 110 may achieve the installation by using a management application programming interface for the virtual machine via inter-process communication. How to install the upgrade file on the virtual machine via the virtual machine manager will be described in detail with reference to FIG. 5 below.

In the above example embodiments, the installation of the upgrade file on the virtual machine is controlled via the virtual machine agent or the virtual machine manager based on the state of the virtual machine, instead of directly installing the upgrade file on the virtual machine via the network, thereby achieving the installation of the upgrade file on the virtual machine when the virtual machine is not accessible via the network. In addition, in such a way, it is not necessary to install an additional upgrade apparatus for implementing the virtual machine upgrade on the virtual machine, thereby simplifying the virtual machine configuration.

Figure 4:
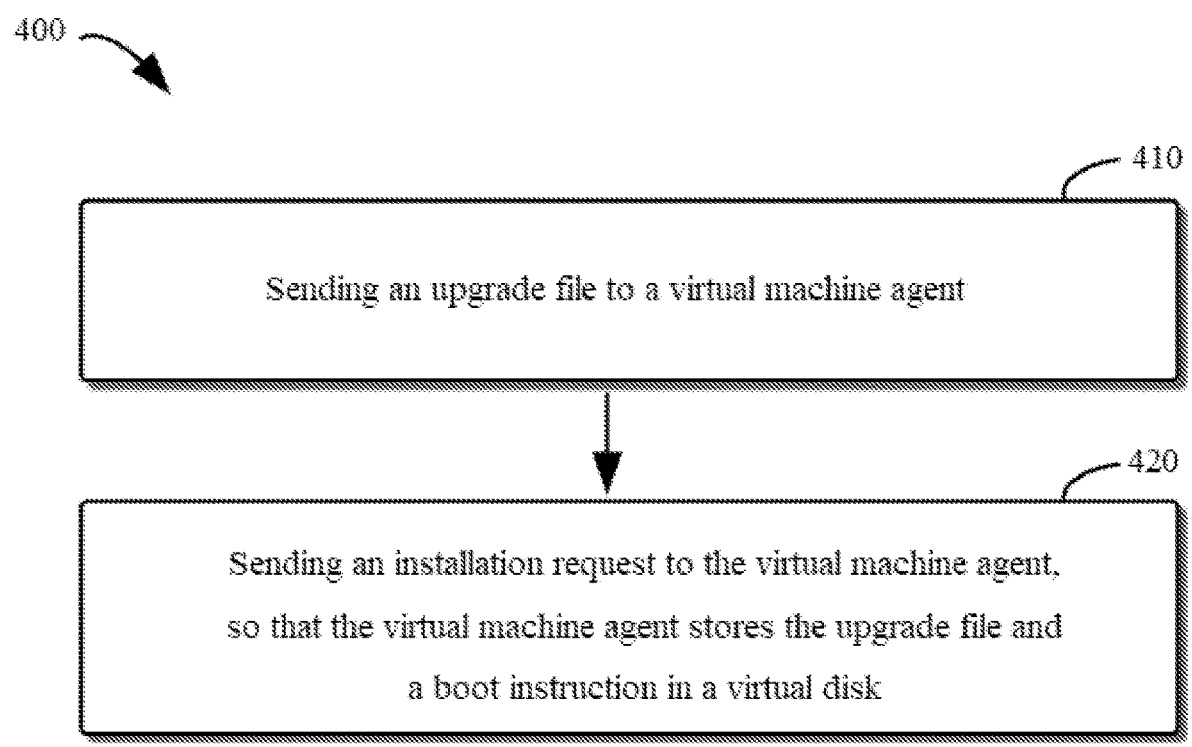
FIG. 4 shows a flowchart of an example method for controlling installation of an upgrade file on a virtual machine according to an embodiment of the present disclosure.

FIG. 4 shows a flowchart of example method 400 for controlling installation of an upgrade file on a virtual machine according to an embodiment of the present disclosure. Method 400 is an embodiment of block 320 in method 300. For example, method 400 may be executed by upgrade management device 110 as shown in FIG. 1. It should be understood that method 400 may also be executed by other devices. The scope of the present disclosure is not limited in this regard. It should also be understood that method 400 may further include additional actions that are not shown and/or may omit actions that are shown. The scope of the present disclosure is not limited in this regard.

In 410, upgrade management device 110 sends an upgrade file to virtual machine agent 130. In 420, upgrade management device 110 sends an installation request to virtual machine agent 130, so that virtual machine agent 130 stores the upgrade file and a boot instruction in virtual disk 150.

In some embodiments, after upgrade management device 110 determines that a state of virtual machine 120 indicates virtual machine 120 not being accessible via a network, for example, after determining that virtual machine 120 is in a power-off state (not running), upgrade management device 110 may send an installation request to virtual machine agent 130, so that virtual machine agent 130 is associated with virtual disk 150 of virtual machine 120. For example, virtual machine agent 130 may be associated with virtual disk 150 of virtual machine 120 by using an application programming interface, such as a vSphere management API. Then, virtual machine agent 130 converts virtual disk 150 into a file system, thereby making it possible to read and write a file system corresponding to virtual disk 150. Then, virtual machine agent 130 stores the upgrade file in virtual disk 150.

Additionally, in some embodiments, the installation request sent by upgrade management device 110 to virtual machine agent 130 may further cause virtual machine agent 130 to store the boot instruction in virtual disk 150 of virtual machine 120, so that virtual machine 120 installs the upgrade file based on the boot instruction when starting running. For example, in some embodiments, for a virtual machine of an operating system, such as a windows virtual machine, upgrade management device 110 may cause virtual machine agent 130 to open a registration file of the virtual machine offline to add a new enabled instruction as the boot instruction to an operating system entry. Alternatively, in some other embodiments, for virtual machines of other operating systems, such as a Linux virtual machine, upgrade management device 110 may cause virtual machine agent 130 to modify a route, for example, /etc/rc.d/rc.local, to add an enabled instruction as the boot instruction.

It should be understood that some application programming interfaces are shown for exemplary purposes only, and do not imply any limitation on the scope of the present disclosure. For example, the virtual machine agent may also be associated with the virtual disk of the virtual machine in other ways. The present disclosure is not limited in this regard.

In the above example embodiments, the installation request is sent to the virtual machine agent, such that the virtual machine agent stores the upgrade file and the boot instruction in the virtual disk of the virtual machine, thereby achieving the installation of the upgrade file on the virtual machine when the virtual machine is not running, and reducing the communication costs between the administrator of the virtual machine and the administrator of the upgrade management device. In addition, in such a way, it is only necessary to establish a network connection between the upgrade management device and the virtual machine agent, instead of establishing a network connection for each virtual machine, thereby significantly reducing the occupancy of ESXI external bandwidth.

Figure 5:
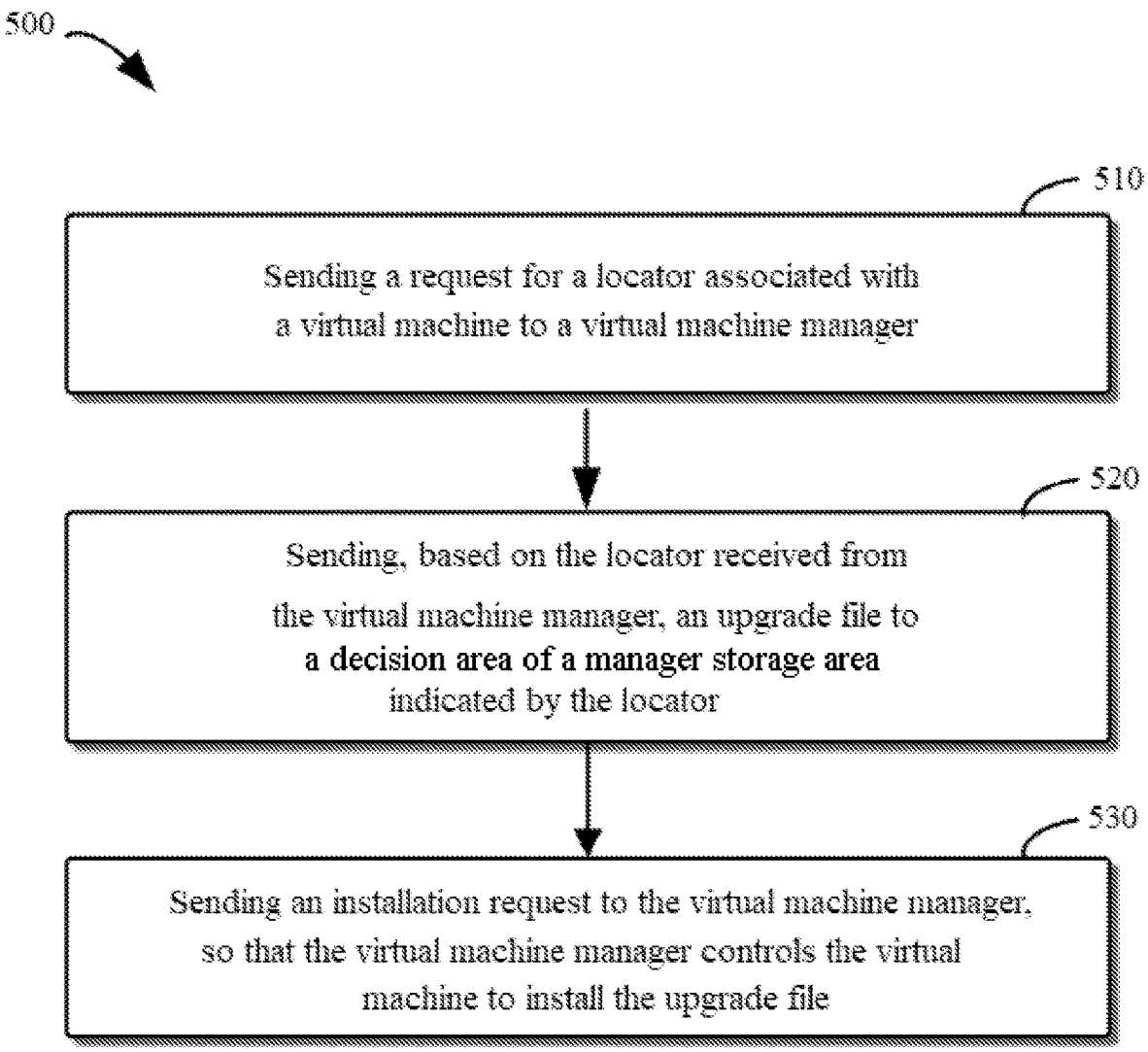
FIG. 5 shows a flowchart of an example method for controlling installation of an upgrade file on a virtual machine according to an embodiment of the present disclosure.

FIG. 5 shows a flowchart of example method 500 for controlling installation of an upgrade file on a virtual machine according to an embodiment of the present disclosure. Method 500 is an embodiment of block 320 in method 300. For example, method 500 may be executed by upgrade management device 110 as shown in FIG. 1. It should be understood that method 500 may also be executed by other devices. The scope of the present disclosure is not limited in this regard. It should also be understood that method 500 may further include additional actions that are not shown and/or may omit actions that are shown. The scope of the present disclosure is not limited in this regard.

In 510, upgrade management device 110 sends a request for a locator associated with virtual machine 120 to virtual machine manager 140.

In some embodiments, after upgrade management device 110 determines that a state of virtual machine 120 indicates virtual machine 120 not being accessible via a network, for example, after determining that virtual machine 120 is in a power-on state (running) but does not have a network connection, upgrade management device 110 may send the request for the locator associated with virtual machine 120 to virtual machine manager 140. For example, in some embodiments, upgrade management device 110 may invoke an application programming interface, such as vSphere management InitiateFileTransferFromGuest API, to request a uniform resource locator (URL) associated with virtual machine 120 from virtual machine manager 140. Virtual machine manager 140 will control an ESXI server where virtual machine 120 is to send a file at a manager storage area indicated by the URL to virtual machine 120 using inter-process communication.

In 520, upgrade management device 110, based on the locator received from virtual machine manager 140, sends an upgrade file to a manager storage area indicated by the locator.

In some embodiments, after receiving the URL returned by virtual machine manager 140, upgrade management device 110 sends the upgrade file to the manager storage area indicated by the URL. As mentioned above, after receiving the upgrade file, virtual machine manager 140 will send the upgrade file to virtual machine 120 using the inter-process communication. In such a way, no network is required to send the upgrade file.

In 530, upgrade management device 110 sends an installation request to virtual machine manager 140, so that virtual machine manager 140 controls virtual machine 120 to install the upgrade file.

In some embodiments, after completing sending the upgrade file, upgrade management device 110 invokes the application programming interface, such as vSphere StartProgramInGuest API, so that virtual machine 120 executes an installation instruction in the upgrade file to complete upgrading.

It should be understood that some application programming interfaces are shown for exemplary purposes only, and do not imply any limitation to the scope of the present disclosure. For example, the request may also be sent to the virtual machine manager in other ways. The present disclosure is not limited in this regard.

In the above example embodiments, the installation of the upgrade file on the virtual machine is controlled via the virtual machine manager, thereby achieving the installation of the upgrade file on the virtual machine when the virtual machine is running but does not have a network connection.

Figure 6:
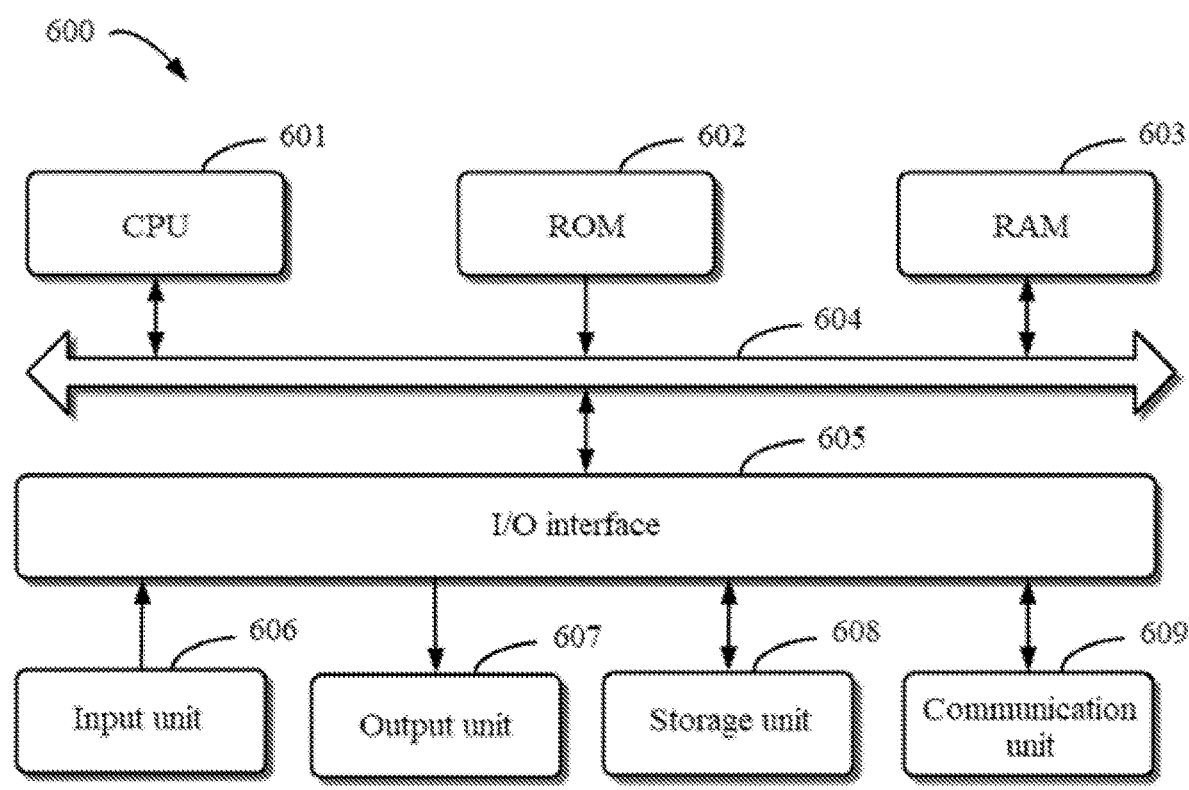
FIG. 6 shows a schematic block diagram of an example electronic device that may be configured to implement the embodiments of the present disclosure.

FIG. 6 shows a schematic block diagram of example electronic device 600 that may be configured to implement the embodiments of the present disclosure. For example, upgrade management device 110 as shown in FIG. 1 may be implemented by electronic device 600. As shown in FIG. 6, electronic device 600 includes central processing unit (CPU) 601, which may execute various appropriate actions and processing in accordance with computer program instructions stored in read-only memory (ROM) 602 or computer program instructions loaded onto random access memory (RAM) 603 from storage unit 608. RAM 603 may further store various programs and data required for operations of electronic device 600. CPU 601, ROM 602, and RAM 603 are connected to each other through bus 604. An input/output (I/O) interface 605 is also connected to bus 604.

A plurality of components in electronic device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows electronic device 600 to exchange information/data with other devices via a computer network such as the Internet and/or various telecommunication networks.

The processes and processing described above, such as methods 300, 400, and 500, may be executed by processing unit 601. For example, in some embodiments, methods 300, 400, and 500 may be implemented as computer software programs that are tangibly included in a machine-readable medium, such as storage unit 608. In some embodiments, some or all of the computer program can be loaded into and/or installed onto electronic device 600 via ROM 602 and/or communication unit 609. When the computer program is loaded into RAM 603 and executed by CPU 601, one or more actions of methods 300, 400, and method 500 described above may be executed.

The present disclosure may be a method, an apparatus, a system, and/or a computer program product. The computer program product may include a computer-readable storage medium with computer-readable program instructions for executing various aspects of the present disclosure loaded thereon.

The computer-readable storage medium may be a tangible device that can retain and store instructions used by an instruction executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or in-groove protruding structures with instructions stored thereon, and any suitable combination thereof. The computer-readable storage medium used herein is not construed as transient signals themselves, such as radio waves or other freely propagated electromagnetic waves, electromagnetic waves propagated through waveguides or other transmission media (e.g., optical pulses through fiber-optic cables), or electrical signals transmitted through wires.

The computer-readable program instructions described here can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source codes or object codes written in any combination of one or more programming languages. The programming languages include object-oriented programming languages, such as Smalltalk or C++, and also include conventional procedural programming languages, such as "C" language or similar programming languages. The computer-readable program instructions can be executed entirely on a user computer, partly on a user computer, as a separate software package, partly on a user computer and partly on a remote computer, or entirely on a remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The computer-readable program instructions may be executed by the electronic circuit to implement various aspects of the present disclosure.

Various aspects of the present disclosure are described here with reference to the flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show architectures, functions, and operations of possible implementations of the system, the method, and the computer program product according to a plurality of embodiments of the present disclosure. In this regard, each block in the flowcharts or block diagrams may represent a module, a program segment, or part of an instruction, said module, program segment, or part of an instruction including one or more executable instructions for implementing specified logical functions. In some alternative implementations, the functions denoted in the blocks may occur in a sequence different from that shown in the figures. For example, any two blocks presented in succession may actually be executed substantially in parallel, or may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or technological improvements of the technologies on the market, or to cause other persons of ordinary skills in the art to understand the embodiments disclosed herein.

The invention claimed is:

1. A method for managing virtual machine upgrade, comprising:

receiving, at a virtual machine, an upgrade file from a virtual machine manager using inter-process communication when the virtual machine does not have access to a network;

determining, based on the received upgrade file for the virtual machine, a state of the virtual machine, wherein determining the state of the virtual machine includes determining, based on a state indicator received from the virtual machine manager, an operational state of the virtual machine; and controlling, based on determining that the state of the virtual machine indicates the virtual machine not being accessible via the network, installation of the upgrade file on the virtual machine via a virtual machine agent or the virtual machine manager, the virtual machine agent being capable of modifying a virtual disk of the virtual machine, including converting the virtual disk into a file system and storing the upgrade file in the virtual disk, wherein controlling the installation of the upgrade file on the virtual machine comprises, at least, determining, based on the operational state, whether the virtual machine is running.

2. The method according to claim 1, wherein controlling the installation of the upgrade file on the virtual machine further comprises:

controlling, based on determining that the virtual machine is not running, the installation of the upgrade file on the virtual machine via the virtual machine agent; and controlling, based on determining that the virtual machine is running, the installation of the upgrade file on the virtual machine via the manager.

3. The method according to claim 1, wherein controlling the installation of the upgrade file on the virtual machine via the virtual machine agent comprises:

sending the upgrade file to the virtual machine agent; and sending an installation request to the virtual machine agent, so that the virtual machine agent stores the upgrade file and a boot instruction in the virtual disk, and thus the virtual machine installs the upgrade file based on the boot instruction when the virtual machine starts running.

4. The method according to claim 1, wherein controlling the installation of the upgrade file on the virtual machine via the manager comprises:

sending a request for a locator associated with the virtual machine to the manager, a file at a manager storage area indicated by the locator to be sent by the manager to the virtual machine;

sending, based on the locator received from the manager, the upgrade file to the manager storage area indicated by the locator; and sending an installation request to the manager, so that the manager controls the virtual machine to install the upgrade file.

5. An electronic device, comprising:
at least one processing unit;
at least one memory, the at least one memory being coupled to the at least one processing unit and storing instructions to be executed by the at least one processing unit, the instructions, when executed by the at least one processing unit, causing the electronic device to execute an action, the action comprising:

receiving, at a virtual machine, an upgrade file from a virtual machine manager using inter-process communication when the virtual machine does not have access to a network;

determining, based on the received upgrade file for the virtual machine, a state of the virtual machine, wherein determining the state of the virtual machine includes determining, based on a state indicator received from the virtual machine manager, an operational state of the virtual machine; and controlling, based on determining that the operational state of the virtual machine indicates the virtual machine not being accessible via the network, installation of the upgrade file on the virtual machine via a virtual machine agent or the virtual machine manager, the virtual machine agent being capable of modifying a virtual disk of the virtual machine, including converting the virtual disk into a file system and storing the upgrade file in the virtual disk, wherein controlling the installation of the upgrade file on the virtual machine comprises, at least, determining, based on the operational state, whether the virtual machine in running.

6. The electronic device according to claim 5, wherein controlling the installation of the upgrade file on the virtual machine further comprises:

controlling, based on determining that the virtual machine is not running, the installation of the upgrade file on the virtual machine via the virtual machine agent; and controlling, based on determining that the virtual machine is running, the installation of the upgrade file on the virtual machine via the manager.

7. The electronic device according to claim 5, wherein controlling the installation of the upgrade file on the virtual machine via the virtual machine agent comprises:

sending the upgrade file to the virtual machine agent; and sending an installation request to the virtual machine agent, so that the virtual machine agent stores the upgrade file and a boot instruction in the virtual disk, and thus the virtual machine installs the upgrade file based on the boot instruction when the virtual machine starts running.

8. The electronic device according to claim 5, wherein controlling the installation of the upgrade file on the virtual machine via the manager comprises:

sending a request for a locator associated with the virtual machine to the manager, a file at a manager storage area indicated by the locator to be sent by the manager to the virtual machine;

sending, based on the locator received from the manager, the upgrade file to the manager storage area indicated by the locator; and sending an installation request to the manager, so that the manager controls the virtual machine to install the upgrade file.

9. A computer program product, the computer program product being tangibly stored in a non-transitory computer storage medium and comprising machine-executable instructions, the machine-executable instructions, when executed by a device, causing the device to perform operations, the operations comprising:

receiving, at a virtual machine, an upgrade file from a virtual machine manager using inter-process communication when the virtual machine does not have access to a network;

determining, based on the received upgrade file for the virtual machine, a state of the virtual machine, wherein determining the state of the virtual machine includes determining, based on a state indicator received from the manager, an operational state of the virtual machine; and controlling, based on determining that the operational state of the virtual machine indicates the virtual machine not being accessible via the network, installation of the upgrade file on the virtual machine via a virtual machine agent or the virtual machine manager, the virtual machine agent being capable of modifying a virtual disk of the virtual machine, including converting the virtual disk into a file system and storing the upgrade file in the virtual disk, wherein controlling the installation of the upgrade file on the virtual machine comprises, at least, determining, based on the operational state, whether the virtual machine is running.

10. The computer program product according to claim 9, wherein controlling the installation of the upgrade file on the virtual machine further comprises:

controlling, based on determining that the virtual machine is not running, the installation of the upgrade file on the virtual machine via the virtual machine agent; and controlling, based on determining that the virtual machine is running, the installation of the upgrade file on the virtual machine via the manager.

11. The computer program product according to claim 9, wherein controlling the installation of the upgrade file on the virtual machine via the virtual machine agent comprises:

sending the upgrade file to the virtual machine agent; and sending an installation request to the virtual machine agent, so that the virtual machine agent stores the upgrade file and a boot instruction in the virtual disk, and thus the virtual machine installs the upgrade file based on the boot instruction when the virtual machine starts running.

12. The computer program product according to claim 9, wherein controlling the installation of the upgrade file on the virtual machine via the manager comprises: sending a request for a locator associated with the virtual machine to the manager, a file at a manager storage area indicated by the locator to be sent by the manager to the virtual machine;

sending, based on the locator received from the manager, the upgrade file to the manager storage area indicated by the locator; and sending an installation request to the manager, so that the manager controls the virtual machine to install the upgrade file.

* * * * *